United States Patent [19]

Danloup et al.

[11] Patent Number: 5,400,089

[45] Date of Patent: Mar. 21, 1995

[54] EYEGLASS FRAME WITH IMPROVED SECUREMENT OF LENSES THEREIN

[75] Inventors: André Danloup, Champigny sur Marne; Claude Hubin, Saint Mihiel, both of France

[73] Assignee: Essilor International Cie Generale d'Optique, Creteil Cedex, France

[21] Appl. No.: 111,934

[22] Filed: Aug. 26, 1993

[30] Foreign Application Priority Data

Sep. 4, 1992 [FR] France .................. 92 10561

[51] Int. Cl.$^6$ .................................................. G02C 1/08
[52] U.S. Cl. ........................................ 351/92; 351/96; 351/154
[58] Field of Search ............. 351/83, 86, 96, 106, 351/154, 178, 92

[56] References Cited

U.S. PATENT DOCUMENTS

| 1,600,605 | 9/1926 | Stevens | 351/86 |
|---|---|---|---|
| 2,427,465 | 5/1944 | La Vista | 351/154 |
| 2,914,986 | 2/1959 | Zakin | 351/154 |
| 3,829,201 | 8/1974 | Whitting | 351/154 |
| 4,340,282 | 7/1982 | Murakami | 351/154 |
| 4,971,431 | 11/1990 | Gerard | 351/86 |

FOREIGN PATENT DOCUMENTS

| 80578/82 | 5/1984 | Australia . |
| 0061002 | 9/1982 | European Pat. Off. . |
| 0312465 | 4/1989 | European Pat. Off. . |
| 1551484 | 11/1968 | France . |
| 2112803 | 6/1972 | France . |
| 2528967 | 12/1976 | Germany . |
| 1237793 | 6/1971 | United Kingdom . |
| 2061549 | 5/1981 | United Kingdom . |

Primary Examiner—William L. Sikes
Assistant Examiner—Huy Mai
Attorney, Agent, or Firm—Young & Thompson

[57] ABSTRACT

An eyeglass frame has rims or surrounds at least locally made from a relatively rigid material. They have in transverse cross-section over at least part of their length a U-shape profile with a median part and side flanges. A strip of relatively flexible material is associated with each rim or surround and is disposed between it and the respective lens. The median part of the profile of the rims or surrounds has an increased thickness in its median area.

12 Claims, 1 Drawing Sheet

EYEGLASS FRAME WITH IMPROVED SECUREMENT OF LENSES THEREIN

BACKGROUND OF THE INVENTION

1. Field of the Invention

The present invention concerns eyeglass frames and especially frames in which the rims or surrounds are at least in part made from a relatively rigid material such as a metal or an alloy, for example.

2. Description of the Prior Art

It is usual in this case for the rims or surrounds to have a U-shape cross-section with a median part and side flanges to hold the mineral or organic lenses over at least part of their length.

This is the case in French patent No 1 281 449, for example.

These metal eyeglass frames have the advantage of being very thin. The overall outside thickness of their visible part, that is to say of their rims or surrounds, can advantageously be made small because of the stiffness of the material from which they are made.

Whether these rims or surrounds are complete, i.e. made from a relatively rigid material over all of their length, closing by means of a lug onto the lenses that they enclose, or partial, i.e. only a portion of their length is made from a relatively rigid material, running along the top or bottom of the lenses, with a metal or synthetic material filament completing them below or above the lenses, the problem arises of matching the lenses to the contour of the relatively rigid material portion.

Failing such matching, there is the risk that the lenses will be insufficiently securely retained with the result that they may rotate or even drop out, or the risk of localised excessive clamping of the lenses which may damage them, for example cause them to chip.

To counter this risk it was proposed many years ago to associate with each rim or surround a strip of relatively flexible material adapted to be disposed radially between the rim or surround and the respective lens, along the edge of the latter, with the advantage of preventing any contact between the lens and the rim or surround.

This is the case in French patents Nos 1 551 484 and 2 467 417, for example.

To retain the relatively flexible material strip the strip and the associated rim or surround have complementary shapes.

At present this means that in practice the median part of the U-shaped profile of the rim or surround must be made thinner, at least in a localised area, to form a groove in which a complementary rib on the strip of relatively flexible material is engaged. This is the case in French patents Nos 1 551 484 and 2 467 417.

Being made thinner and therefore weaker in its median part, the U-shape profile of a rim or surround of this kind can tend to open like a hinge, for example if loads are applied to the side flanges. These loads are not necessarily the same on both flanges.

As previously, this can result in insufficiently secure retention of the lenses and even their possible loss.

A general object of the present invention is an arrangement whereby this problem is circumvented.

SUMMARY OF THE INVENTION

The invention consists in an eyeglass frame comprising rims or surrounds which are at least locally made from a relatively rigid material and have in transverse cross-section over at least part of their length a U-shape profile with a median part and side flanges and a strip of relatively flexible material associated with each rim or surround and adapted to be disposed between it and the respective lens wherein the median part of the profile of the rims or surrounds has an increased thickness in its median area.

In other words, the thickness of the median part of the profile is greater in its median area than at its ends.

As a result, this profile has the advantage that there is no longer any tendency for it to open.

The increased thickness of the median part of this profile in its median area is preferably equal to at least 0.5 times the overall outside thickness of the rim or surround, being greater than 0.6 times this overall outside thickness, for example.

None of this is visible from the outside, however.

Thus the reinforcement in accordance with the invention of the median part of the profile of the rims or surrounds is not detrimental to their external appearance, which is advantageous.

In other words, the arrangement in accordance with the invention provides an advantageous combination of thin rims or surrounds, as required, and adequate retention of the lenses.

The features and advantages of the invention will emerge from the following description given by way of example with reference to the appended diagrammatic drawings.

DETAILED DESCRIPTION OF THE INVENTION

An eyeglass frame comprises two rims or surrounds 10 which are joined together at the nose side by a center bridge 11 and to each of which a side member 12 is hinged at the temple side.

The invention is more particularly directed to the case where the rims or surrounds 10, only one of which is shown in the figures, are at least locally made from a relatively rigid material such as a metal or a metal alloy, for example.

Figure 1:
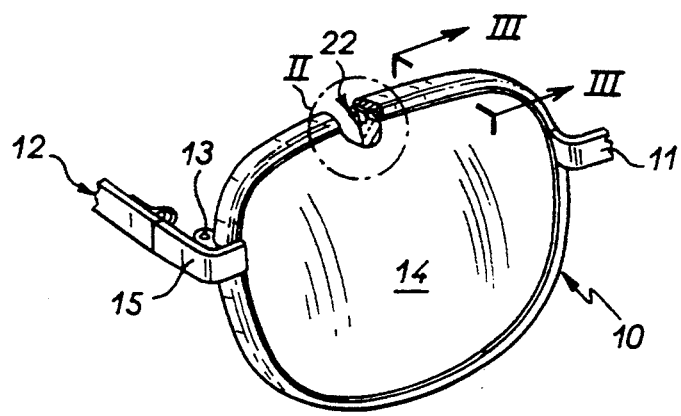
FIG. 1 a partially cut away partial view in perspective of an eyeglass frame in accordance with the invention.
Figure 2:
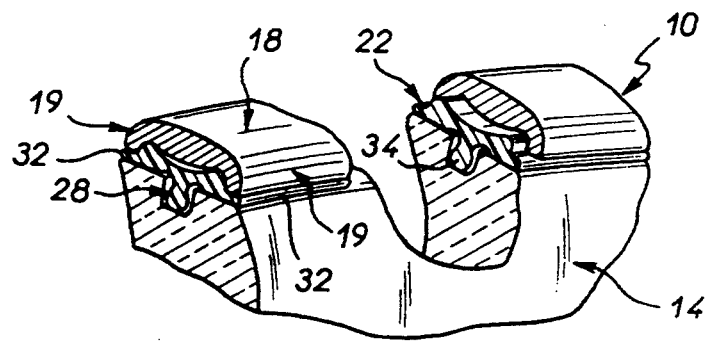
FIG. 2 shows to a larger scale the part of FIG. 1 marked II.
Figure 3:
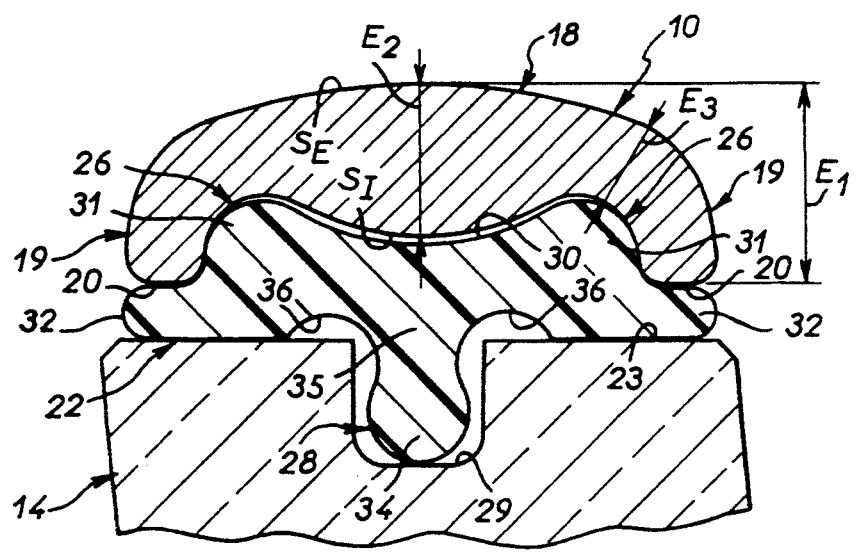
FIG. 3 is a partial view of the eyeglass frame in accordance with the invention in transverse cross-section on the line III—III in FIG. 1 and to a still larger scale.

In the embodiment shown in FIGS. 1 through 3 the rims or surrounds 10 are complete.

In other words, they are continuously of a relatively rigid material over their entire length, closing by means of a lug 13 onto the lenses 14 that they surround at the tenon 15 by means of which a side branch 12 is articulated to them.

These arrangements are well known in themselves and as they do not form any part of the present invention they are not described in further detail here.

In a manner that is also known in itself, and as can be seen more clearly in FIG. 3, over part at least of their length and in practice over all of their length the rims or surrounds 10 have a U-shape profile in transverse cross-section with a median part 18 and side flanges 19.

The outside surface $S_E$ of the median part 18 is globally convex in transverse cross-section and merges with that of the side flanges 19 through respective portions with large radii of curvature.

Let $E_1$ be the overall outside thickness of the rims or surrounds 10 as measured between the top of the outside surface $S_E$ of their median part 18 and the edge 20 of their side flanges 19.

In practice this is the height of the rims or surrounds 10 as seen in elevation and therefore the height of the visible part of the eyeglass frame concerned in this area.

The profile of the rims or surrounds 10 is shaped to follow a particular contour.

In a manner that is also known in itself there is associated with each of the rims or surrounds 10 over part at least of its length (in practice over all of its length) a strip 22 of relatively flexible material adapted to be disposed radially between it and the respective lens 14, along the edge 23 of the latter.

The strip 22 is made from polypropylene or polyamide, for example, and also has a particular shape profile.

In all cases, the material from which it is made is preferably not subject to cold flow or creep.

The strip 22 advantageously prevents direct contact between the rims or surrounds 10 and the lenses 14 but retains the lenses 14 relative to the rims or surrounds 10.

In accordance with the invention the median part 18 of the profile of the rims or surrounds 10 is of increased thickness $E_2$ in its median area.

In other words, the median part 18 has in its median area a thickness $E_2$ greater than its thickness $E_3$ at its ends, i.e. where it joins onto the side flanges 19.

As shown here, the thickness $E_2$ of the median part 18 is preferably at least equal to 0.5 times the overall outside thickness $E_1$.

It is greater than 0.6 times this overall outside thickness $E_1$, for example.

In the embodiment shown it is substantially equal to 0.75 times the latter.

The inside surface $S_I$ of the median part 18 of the profile of rims or surrounds 10 is globally convex in transverse cross-section.

It is globally rounded and merges with the inside surfaces of the side flanges 19 between which it lies through portions with large radii of curvature.

The strip 22 has a T-shape profile in transverse cross-section with side arms 26 disposed between the side flanges 19 of the profile of the rims or surrounds 10 and a center web 28 adapted to be received in a groove 29 provided for this purpose on the edge 22 of the lens 14.

The side arms 26 of the strip 22 have a shape in transverse cross-section that is globally complementary to that of the median part 18 of the profile of the rims or surrounds 10.

In line with the median web 28 they jointly form a depression 30 complementary to the swelling at this point in the median part 18 of the profile of the rims or surrounds 10. At their ends each has an enlarged portion 31 complementary to the large radius of curvature surfaces through which the median part 18 joins the side flanges 19 between which its lies.

As seen in transverse cross-section, each of the side arms 26 of the strip 22 has a respective extension 32 at the end engaged under the edge 20 of the respective side flange 19 of the profile of the respective rim or surround 10. This extension projects as far as the outside surface of the side flanges 19.

These extensions 32 are not indispensable but they advantageously fill the gap between each lens 14 and the edge 20 of the side flange 19 of the rim or surround 10.

They are then the only part of the strip 22 visible from the outside.

As seen in transverse cross-section, the median web 28 of the strip 22 is wider at the free end 34 that at the root 35, with a generously rounded contour so that its overall profile is nipple-shape.

In transverse cross-section the strip 22 has generously rounded recesses 36 between its median web 28 and its side arms 26, at the root of the median web 28.

In this way it is advantageously able to cater for any manufacturing tolerances by circumventing the edges of the grooves 29 in the lenses 14.

Figure 4:
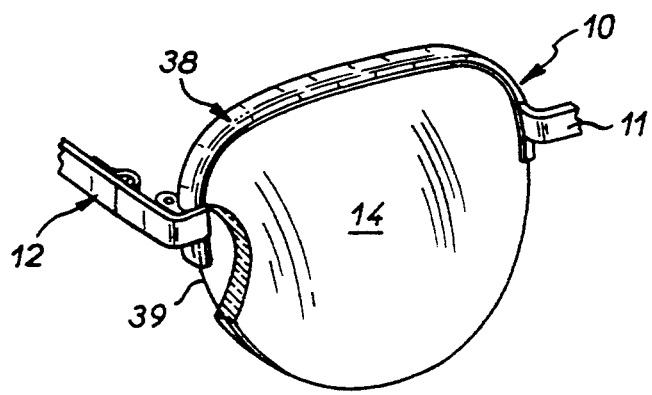
FIG. 4 is a partial perspective view analogous to that of FIG. 1 showing another type of eyeglass frame.

FIG. 4 shows the application of the invention to the situation in which only a rail portion 38 of the rims or surrounds 10 is made from a relatively rigid material, the rims or surrounds 10 being complemented by a filament 39 extending from one end to the other of this rail portion 38.

The rail portion 38 of the rims or surrounds 10 extends across the top of the lenses 14 and the filament 39 runs under them.

These arrangements are well-known in themselves and as they do not form any part of the present invention they are not described in further detail here.

According to the invention, a strip 22 is associated with the rail portion 38 of the rims or surrounds 10.

In either case (full or partial rims or surrounds) the strip 22 is fastened to the rims or surrounds 10 and the lenses 14 are fastened to it.

Thus the lenses 14 are held at least in part by the strip 22.

The present invention is obviously not limited to the embodiments described and shown, but encompasses any variant execution thereof.

Specifically, rather than being fastened by virtue of complementary shapes of the rims or surrounds and the relatively flexible material strip, the strip could be fastened by any other means, for example by adhesive bonding.

The fastening may be temporary or permanent.

Although in the embodiment specifically described there is some clearance at the sides between the median web of the relatively flexible material strip and the sides of the groove in the lens in which the median web is engaged, this clearance could obviously be eliminated.

This occurs in practice anyway when the median web is compressed by the clamping effect.

In this case the clearance initially present is provided merely to facilitate assembly.

What is claimed is:

1. Eyeglass frame comprising rims or surrounds which are at least locally made from a relatively rigid material and have in transverse cross-section over at least part of their length a U-shape profile with a median part and side flanges and a strip of relatively flexible material associated with each rim or surround and adapted to be disposed between the rim or surround and a respective lens, wherein said median part of said profile of said rims or surrounds has an inwardly extending protrusion of said rims or surrounds has an inwardly extending protrusion of an increased thickness in a median area of said median part.

2. Eyeglass frame according to claim 1 wherein said median part has a thickness in its median area greater than its thickness at its ends.

3. Eyeglass frame according to claim 1 wherein said thickness of said median part in its median area is at least equal to 0.5 times the overall outside thickness of said rims or surrounds.

4. Eyeglass frame according to claim 3 wherein said thickness of said median part in its median area is greater than 0.6 times the overall outside thickness of said rims or surrounds.

5. Eyeglass frame according to claim 1 wherein said strip of relatively flexible material has a T-shape profile in transverse cross-section with said arms which are engaged between said side flanges of said profile of said rims or surrounds and a median web which is adapted to engage with a groove provided in an edge of the respective lens.

6. Eyeglass frame according to claim 5 wherein said side arms of said strip of relatively flexible material have a shape in transverse cross-section substantially complementary to the shape of said median part of said profile of said rims or surrounds.

7. Eyeglass frame according to claim 5 wherein said side arms of said strip of relatively flexible material have in transverse section extensions at ends thereof engaged under edges of said side flanges of said rims or surrounds.

8. Eyeglass frame according to claim 5 wherein said median web of said strip of relatively flexible material is wider in transverse cross-section at a free end than at a zone of attachment of the median web with the side arms.

9. Eyeglass frame according to claim 5 wherein said strip of relatively flexible material has generously rounded recesses where the median web and side arms are joined.

10. Eyeglass frame comprising rims or surrounds which are at least locally made from a relatively rigid material and have in transverse cross-section over at least part of their length a U-shape profile with a median part and side flanges and a strip of relatively flexible material associated with each rim or surround and adapted to be disposed between the rim or surround and a respective lens wherein said median part of said profile of said rims or surrounds has an inwardly extending protrusion of an increased thickness in a median area, and wherein the inside surface of said median part of said profile of said rims or surrounds is globally convex in transverse cross section.

11. Eyeglass frame according to claim 10 Wherein said inside surface of said median part of said profile of said rims or surrounds is globally rounded in transverse cross-section.

12. Eyeglass frame according to claim 11 wherein said inside surface of said median part of said profile of said rims or surrounds merges through surfaces having large radii of curvature with said side flanges between which said median part is disposed.

* * * * *